United States Patent [19]

Morita et al.

[11] Patent Number: 4,788,094

[45] Date of Patent: Nov. 29, 1988

[54] LIGHT CONTROLLING SHEET

[75] Inventors: Masayuki Morita, Komaki; Noboru Takeuchi, Aichi; Masakazu Goto, Konan; Hiroaki Takahashi, Gifu; Takeshi Kojima, Nagoya, all of Japan

[73] Assignee: Kabushiki Kaisha Tokai Rika Denki Seisakusho, Aichi, Japan

[21] Appl. No.: 917,141

[22] Filed: Oct. 9, 1986

[30] Foreign Application Priority Data

Sep. 25, 1986 [JP] Japan .......................... 61-147562[U]

[51] Int. Cl.⁴ .......................... B32B 3/10; G02B 5/30; G02B 27/28
[52] U.S. Cl. .................................. 428/136; 428/137; 428/596; 428/913; 350/370; 350/374; 350/392
[58] Field of Search ............... 428/137, 134, 913, 596, 428/136; 350/370, 374, 392; 342/4; 335/301; 174/35 MS

[56] References Cited

U.S. PATENT DOCUMENTS 4,232,104  11/1980  Shinozaki et al. ............. 428/137 X

FOREIGN PATENT DOCUMENTS 55-139250  4/1979  Japan .

*Primary Examiner*—Alexander S. Thomas
*Attorney, Agent, or Firm*—Birch, Stewart, Kolasch, & Birch

[57] ABSTRACT

The disclosure relates to a light controlling sheet for use with indicators which includes a louver element including an arbitrary pattern of walls which are parallel to each other and opaque so as to absorb light, and an electrically conductive film which is mounted on one surface of the louver element. This film is porous so that the light from a light source may penetrate. The oblique light strikes the opaque walls of the louver element and is absorbed in the walls, while the substantially parallel light is permitted to pass through the space or transparent portion betwee the walls. The electrically conductive film not only acts as a protective cover for the louver element but also shields unwanted electromagnetic wave.

4 Claims, 6 Drawing Sheets

LIGHT CONTROLLING SHEET

BACKGROUND OF THE INVENTION

1. Field of the Invention

The present invention generally relates to a light controlling sheet in use for optical indicators such as cathode ray tubes, liquid crystal indication devices and the like, and more particularly to a light controlling sheet for permitting only substantially parallel light to pass therethrough.

2. Description of the Prior Art

Conventionally, there has been provided a light controlling sheet as shown in FIG. 1. The light controlling sheet comprises a louver element 1. A transparent base film 3 is generally cemented with one surface of the louver element 1. The louver element 1 includes a plurality of walls 2 which are arranged parallel to each other on the transparent base film 3 and which may be formed in arbitrary patterns, such as honeycomb, stripe and grid patterns. The louver element 1 is opaque so that the light striking thereto can be absorbed therein. When the above light controlling sheet is applied to an indication device, a light source (not shown) is positioned behind the transparent film 3. The oblique light $L_1$ emitted from the light source strikes the surface of the walls 2 of the louver element 1 to be absorbed therein. In the meanwhile, the substantially parallel light $L_2$ can pass through the space between the adjacent walls 2. Thus, only the substantially parallel light can reach the observer In addition, according to the light controlling sheet, the extraneous light $L_0$ except that within a predetermined angle of incidence can be excluded. Therefore, the reflection of the extraneous light $L_0$ at the indication face can be effectively prevented.

In the meanwhile, since the conventional light controlling sheet is generally made of insulating synthetic resin, it has the following disadvantages. That is, if the light controlling sheet is applied to for example, a cathode ray tube, it is charged with static electricity. Further, the conventional light controlling sheet can not shield the unwanted electromagnetic wave.

SUMMARY OF THE INVENTION

It is, therefore, an object of the present invention to provide a light controlling sheet of the type as described above, in which the static electricity thereon can be easily eiiminated and the unwanted electromagnetic wave can also be shielded, while the essential function thereof, i.e. the light controlling, is sufficiently maintained.

In accomplishing these and other objects, according to the present invention there is provided a light controlling sheet in use for indicators which comprises a louver element including an arbitrary pattern of walls which are parallel to each other and opaque so as to absorb light, and an electrically conductive film which is mounted on one surface of the louver element and which is porous so that the light from a light source may penetrate.

With the above construction according to the present invention, the light emitted from the light source can be controlled. That is, the oblique light strikes the opaque walls of the louver element to be absorbed in the walls. On the contrary to the above, the substantially parallel light is permitted to pass through the space or transparent portion between the walls. The electrically conductive film not only acts as a protective cover for the louver element but also shields the unwanted electromagnetic wave.

BRIEF DESCRIPTION OF THE DRAWING

The above objects and features of the present invention will become apparent from the following description taken in conjunction with the preferred embodiment thereof, with reference to the accompanying drawings, in which.

DETAILED DESCRIPTION OF THE INVENTION

Figure 1:
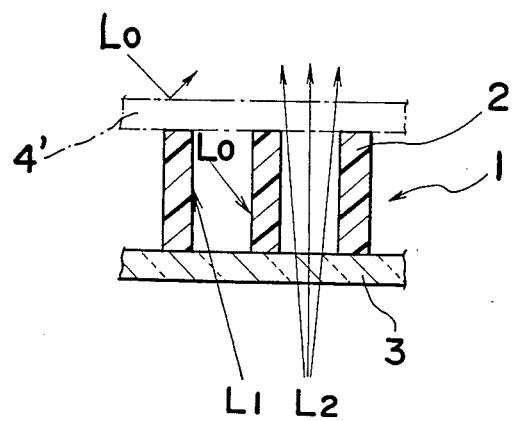
FIG. 1 is an enlarged sectional view of a conventional light controlling sheet, as previously described.

Before the description of the present invention proceeds, it is to be noted that like parts are designated by like reference numerals and symbols throughout the several views of the accompanying drawings.

Figure 2:
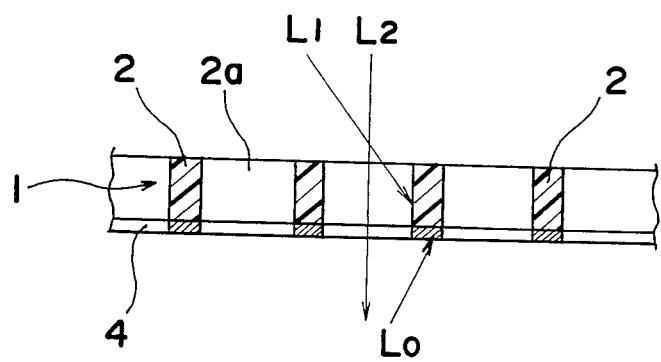
FIG. 2 is an enlarged sectional view of a light controlling sheet according to a preferred embodiment of the present invention.
Figure 3:
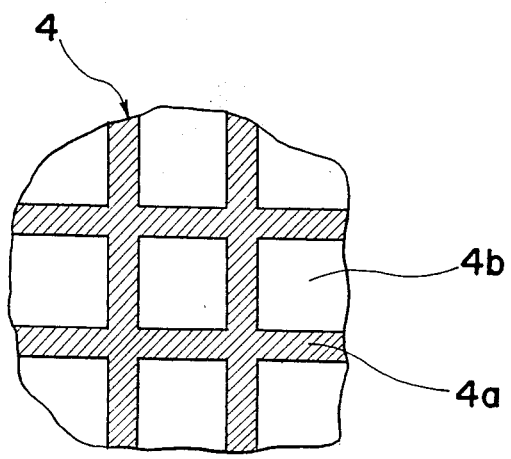
FIG. 3 is a face view of a mask film which is employed in the light controlling sheet shown in FIG. 2.

Referring to FIGS. 2 to 3, there is shown a light controlling sheet of a first embodiment of the present invention. The light controlling sheet comprises a louver element 1 on one surface of which a mask sheet or electrically conductive sheet 4 made of such material as metal is cemented.

The louver element 1 comprises a plurality of walls 2 which are opaque to absorb the striking light and which are arranged parallel to each other. The louver element 1 may have arbitrary wall-patterns. In the first embodiment, the wall pattern is a grid. As shown in FIG. 3, the electrically conductive sheet 4 has completely the same grid pattern as that of the louver element 1. That is to say, the grid portions 4a completely conform with the end faces of the walls 2.

With the first embodiment having the above construction, the oblique light $L_1$ can be absorbed by the opaque walls 2 of the louver element 1, while the substantially parallel light $L_2$ is permitted to pass through the space 2a between the adjacent walls 2 and the hole portions 4b of the electrically conductive sheet 4.

When the above light controlling sheet is applied to an indication surface of an electrical indicator, the film 4 can shield the unwanted electromagnetic wave. Further, if the film 4 is grounded, static electricity can be easily eliminated.

Still further, if the light controlling sheet is mounted so that the film 4 faces outside, the film 4, which is relatively rigid as compared with the louver element 1 of resin, acts as a rigid cover for the louver element 1. The film 4 is preferably designed so as to be opaque in order to exclude the reflection of extraneous light $L_0$ at the outer surface thereof. This is easily understood if it is compared with an other possible solution as shown by a dot-and-dash line in FIG. 1. Referring to FIG. 1, a transparent cover film 4' is cemented with the surface of the louver element 1. In this case, the extraneous light $L_0$ is easily reflect at the outer surface of the film 4', resulting in difficulty in viewing the face thereof.

Figure 4:
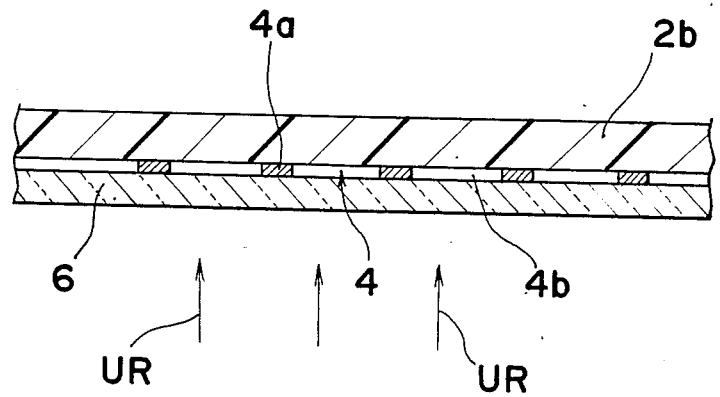
FIG. 4 is an enlarged sectional view showing a process of making the light controlling sheet shown in FIG. 2.

The light controlling sheet according to the first embodiment can be easily made by the following process, which is described herebelow with reference to FIG. 4.

Step 1

The mask film 4 is disposed on a transparent substrate 6.

Step 2

A photosensitive resin film 2b is disposed on the mask film 4 and bonded to it with suitable adhesives. In this embodiment, the photosensitive resin film 2b is of a positive type, that is, the portion receiving the ultraviolet rays can be removed by the development. In addition, the photosensitive resin may alternatively be of a liquid type.

Step 3

The ultraviolet rays UR are projected towards to the structure, as shown in FIG. 4, from the side of substrate 6 so that the photosensitive resin film 2b is exposed to the ultraviolet rays UR. The ultraviolet rays UR can pass through the transparent substrate 6 and the hole portions 4b of the mask film 4 and reach the photosensitive resin film 2b. Therefore, only the portions of the film 2b confronting the hole portions 4b are exposed to the ultraviolet rays UR.

Step 4

The photosensitive resin film 2b is developed so that the portions exposed to the ultraviolet rays UR are removed. As a result, a louver element or louver structure with the mask film 4 can be obtained. That is, the light controlling sheet as obtained includes the mask film 6 integrated with the louver element 2b. The integrated mask film 4 of the light controlling sheet acts as the electrically conductive film 4.

Step 5

Finally, the louver element 1 is treated so as to have the light shielding characteristics. For instance, it is coated with a light absorbing material or treated by dyeing so as to absorb the light. Alternatively, suitable pigment, which can absorb the light, may be previously included in the photosensitive resin film or liquid.

Figure 5:
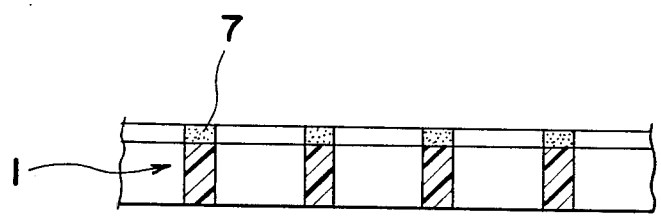
FIG. 5 is an enlarged sectional view of another light controlling sheet according to a second embodiment of the present invention.

Referring to FIG. 5, there is shown a second embodiment of the present invention. In this embodiment, the electrically conductive film is made by using paste of electrically conductive material 7.

Figure 6:
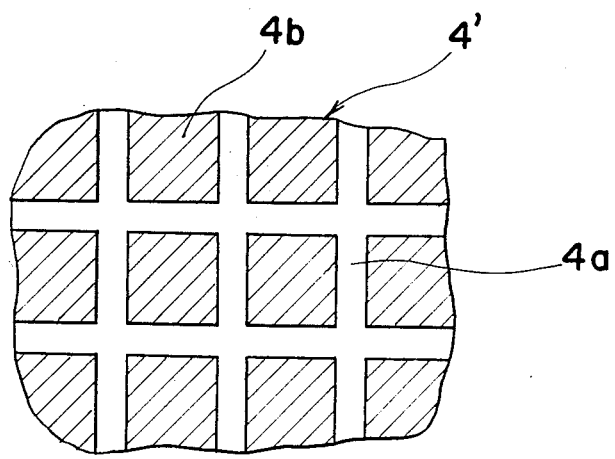
FIG. 6 is a face view of a mask film which is employed in the light controlling sheet shown in FIG. 5.

The process of making the light controlling sheet according to the second embodinent will be described herebelow in detail with reference to FIGS. 6 and 7.

Step 1

A mask film 4' is disposed on a transparent substrate 6, and subsequently a photosensitive resin film 2b is disposed on the mask film 4'. Further, an electrically conductive paste material 7 is coated on the surface of the photosensitive resin film 2b. In this embodiment, the mask film 4' has a grid pattern, as shown in FIG. 6, which is of a negative type and different from that of the first embodiment. That is, the grid portions 4a are transparent, while the rectangular portions 4b surrounded by the grid portions 4a are opaque. In the meanwhile, the photosensitive resin film 2b is of a type that the portions receiving the ultraviolet rays are hardened, while the remaining portions can be removed by the process of the development. In addition, the paste of electrically conductive material 7 is of the same type of photosensitive material as the film 2b.

Step 2

Figure 7:
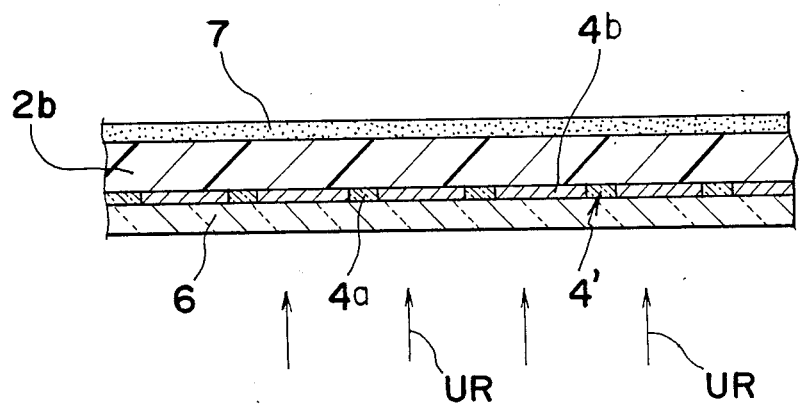
FIG. 7 is an enlarged sectional view showing a process of making the light controlling sheet shown in FIG. 6.

The ultraviolet rays UR are projected towards the structure, as shown in FIG. 7, from the side of the substrate 6 so that the grid portions of the film 2b and paste 7, each corresponding the grid portions 4a of the mask film 4, are hardened.

Step 3

The film 2b and paste 7 are developed so that unhardened portions corresponding to the rectangular portions 4b of the mask film 4 are removed. As a result, the light controlling sheet as shown in FIG. 5 can be obtained.

Step 4

Step 4 is the same as step 5 of the first embodiment.

Figure 8:
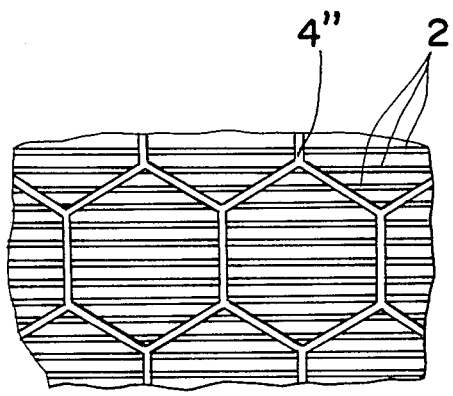
FIG. 8 is a face view of another light controlling sheet according to a third embodiment of the present invention.
Figure 9:
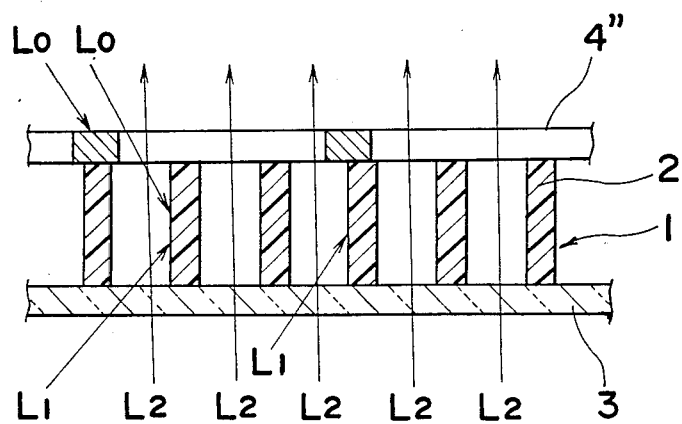
FIG. 9 is an enlarged sectional view of the light controlling sheet shown in FIG. 8.

Next, referring to FIGS. 8 and 9, there is shown another light controlling sheet according to a third embodiment of the present invention. In this embodiment, the pattern of the louver element 1 and the same of the electrically conductive film 4" are different from each other. That is, the louver element 1 has a stripe pattern of wall 2, while the film 4" has a honeycomb pattern. In this embodiment, the light controlling sheet comprises a louver element 1, a transparent base film 3 cemented with the one surface of the louver element 1, and a electrically conductive film 4" cemented with the other surface of the louver element 2. Both the members 1 and 4" are treated so as to be opaque in order to absorb the light. In this embodiment, since the the patterns of the members 1 and 4" are different from each other, the film 4" partially cross the space between the walls 2. However, each cell of the honeycomb pattern of the film 4" is so designed as to large enough that the light $L_2$ passing through the film 3 and the space between the walls 2 penetrate, the cells of the film 4". On the contrary to the above, each cell must be small enough that the finger tips of the operator can not directly contact the outer surface of the louver element 1. That is, the film 4" acts as a protective cover.

With the third embodiment, the extraneous light $L_0$ striking the film 4" and the louver element 1 can be effectively absorbed by them so that light reflection at the film 4" is prevented.

The light controlling sheet according to the third embodiment can be easily made by the following process which will be described in detail with reference to FIGS. 10A to 10F.

Figure 10A:
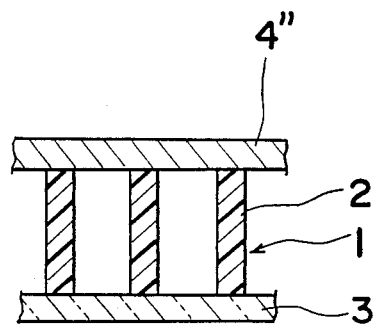
FIGS. 10A to 10F are enlarged sectional views showing a process of making the light controlling sheet shown in FIGS. 8 and 9.

Step 1 (FIG. 10A)

An electrically conductive film 4" made of metal such as stainless steel is adhered to one surface of the louver element 1, having a stripe pattern, to the other surface of which a transparent base film 3 has been previously cemented.

Figure 10B:
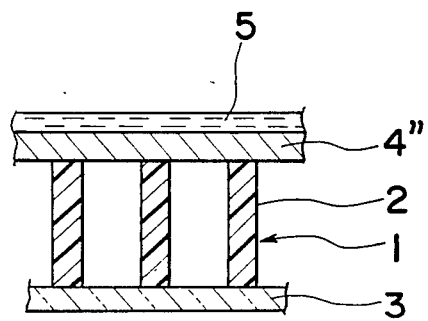

Step 2 (FIG. 10B)

The photosensitive resin liquid 5 is coated on the outer surface of the film 4".

Figure 10C:
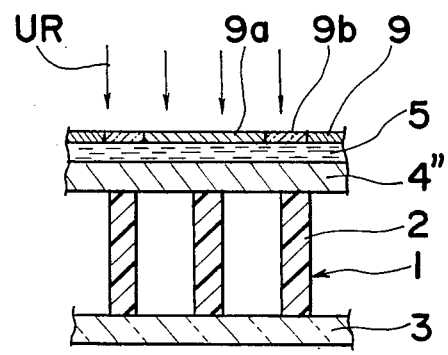

Step 3 (FIG. 10C)

A mask film 9, having a honeycomb pattern, is disposed on the layer of photosensitive resin liquid 5. Subsequently, the ultraviolet rays UR are projected toward the side of the mask film 9. As a result, the portions of the liquid layer 5 corresponding to the transparent portions 9b of the mask film 9 are hardened.

Figure 10D:
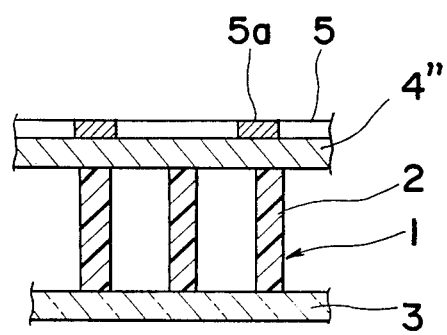
Figure 10E:
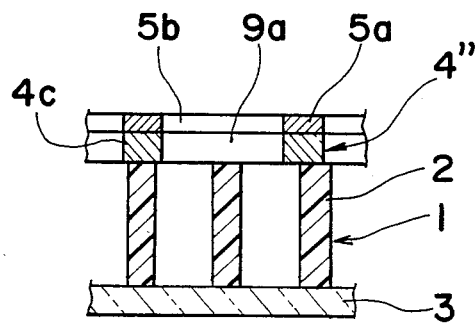

Step 4 (FIG. 10D)

The layer of photosensitive resin 5 is developed so that the unhardened portions corresponding the opaque portions 9a of the mask film 9 are removed. Thus, only the hardened portions 5a are left on the film 4".

Step 5 (FIG. 10 E)

The film 4" is etched with the etching agent. In this case, the portions 4c of the film 4" coated by the hardened portions 5a is hardly etched and left on the louver element 1.

Figure 10F:
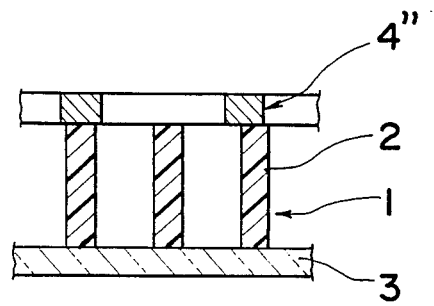

Step 6 (FIG. 10F)

Finally, the layer of hardened portions 5a is removed. Subsequently, the film 4" having the honeycomb pattern is subject to the black oxide treatment or coated by the light absorbing material. As a result, the light controlling sheet as shown in FIGS. 8 and 9 can be obtained.

Figure 12:
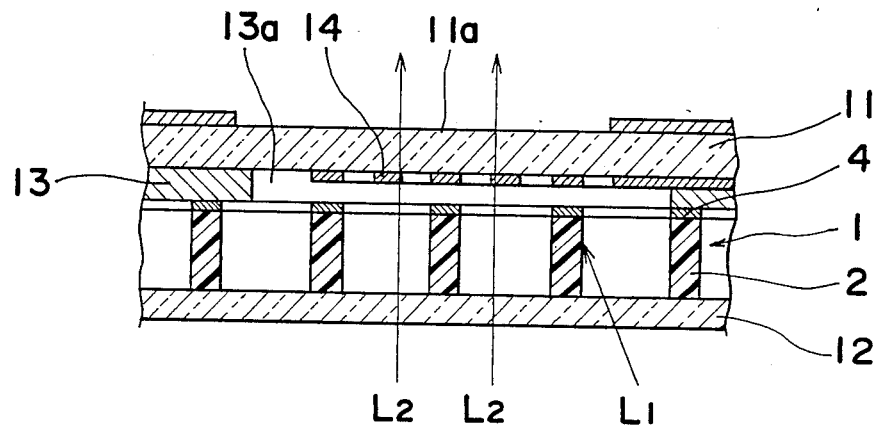
FIG. 12 is an enlarged sectional view of a flat switch to which a light controlling sheet according to the present invention is applied.

The light controlling sheet according to the present invention is preferably applied to a flat switch of a type in which a front surface thereof can be illuminated at night, as shown in FIG. 12. That is, the light controlling sheet can be utilized as a member of the flat switch.

Before the detailed description of the flat switch, a prior art flat switch will be described with reference to FIG. 11.

Figure 11:
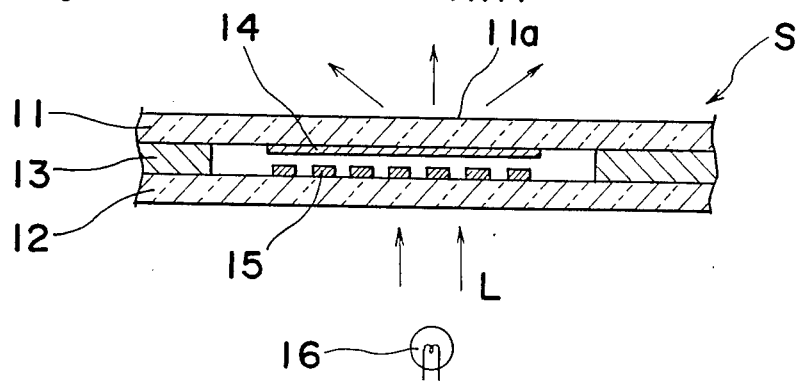
FIG. 11 is an enlarged sectional view of a conventional flat switch.

Referring to FIG. 11, there is shown a flat switch S of a type which is utilized for electrical devices mounted on vehicles. The switch S comprises a pair of transparent films 11 and 12, a spacer 13 interposed between the pair of films 11 and 12, fixed switch contacts 15 mounted on an upper surace of the lower film 12, and a movable switch contact 14 confronting the fixed switch contacts 15. The contacts 14 and 15 are preferably made of transparent material. A light source 16 is located behind the switch S. Then the switch S is illuminated therebehind by the light source 16, the light L penetrates the transparent films 12 and 13. Thus, the operator can easily recognize the position of the switch S. When the front portion 11a of the film 11 is depressed so that the movable contact 14 contacts the fixed contact 15, the switch S is turned on. The known switch S has such a disadvantage that the light L is not controlled, that is, the light L spreads.

According to an embodiment of the present invention, as shown in FIG. 12, such a disadvantage is eliminated.

Referring to FIG. 12, the switch S comprises a light controlling sheet having substantially the same construction as shown FIGS. 2 and 5, i.e. a transparent base film 12, a louver element 1 cemented with upper surface of the film 12 and a electrically conductive film 4 cemented with the upper surface of the louver element 1. On the film 4 a transparent film 11 with an interposed spacer 13 is mounted. The movable switch contacts 14; 14a and 14b are mounted on the lower surface of the film 11. It is to be noted, here, that the electrically conductive film 4 acts also as a fixed switch contact or common switch contact which cooperates with the movable contacts 14.

Figure 13:
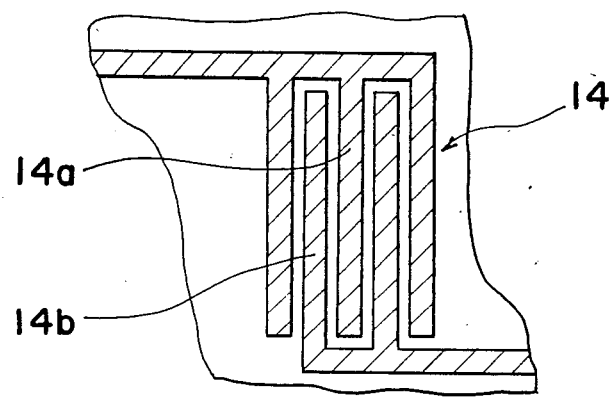
FIG. 13 is face view of members employed to the flat switch shown in FIG. 12.
Figure 13:
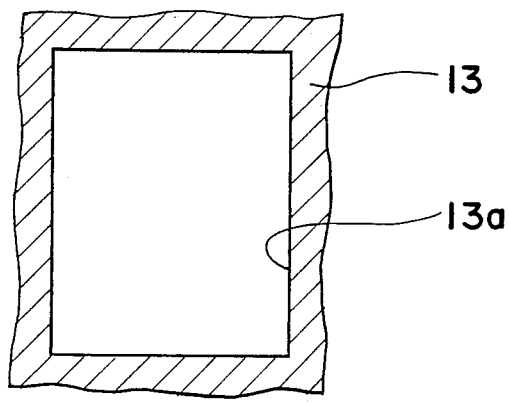
Figure 13:
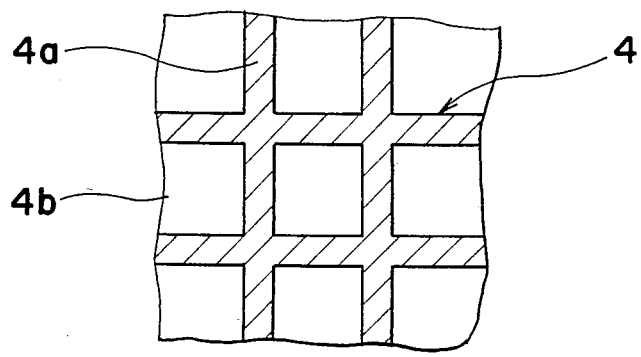

Referring to FIG. 13, there is shown the faces of movable contacts 14, the spacer 13 and the film 4. The movable contacts 14 includes a pair of fork-like contacts 14a and 14b which are separated. The movable contacts 14a and 14b are preferably made of the transparent material. The spacer 13 has a window 13a which confronts the movable contacts 14a and 14b. The electrically conductive film 4 has a grid pattern. The movable contacts 14a and 14b are respectively connected to a suitable electrical circuit (not shown).

With the above flat switch, substantially the parallel light $L_2$ from the light source can pass through the switch S. On the contrary, the oblique light $L_1$ striking the walls 2 of the louver element 1 is absorbed by the opaque walls 2. Therefore, the light from the light source can be controlled. When the front portion 11a of the film 11 is depressed, the pair of movable contacts 14a and 14b contact, respectively, the fixed common contact 4, resulting in the movable contacts 14a and 14b are electrically connected by means of the fixed contact 4. Therefore, the film 4 not only shields the unwanted electromagnetic wave but also acts as a contact member.

Figure 14:
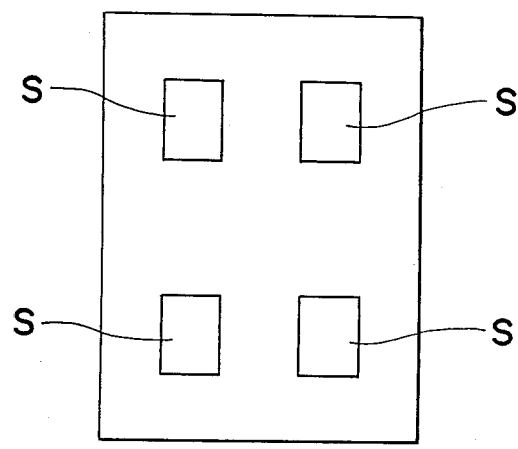
FIG. 14 is a face view of a switch unit including four flat switches each having the construction as shown in FIGS. 12 and 13.

In addition, as shown in FIG. 14, a plurality of flat switches can be assembled in the light controlling sheet and the transparent film 11.

Although the present invention has been fully described by way of example with reference to the accompanying drawings, it is to be noted, here, that various changes and modifications will be apparent to those skilled in the art. Therefore, unless such changes and modifications depart from the scope of the present invention, they should be construed as included therein.

What is claimed is:

1. A light controlling sheet for use in indicators comprising:
   a louver element including an arbitrary pattern of walls having openings therebetween, inner surfaces of said walls defining said openings and extending in a direction of thickness of said louver element, said walls being opaque such that oblique light striking the inner surfaces of said walls may be absorbed by said walls while substantially parallel light may only travel through said openings in a direction which is substantially parallel to said walls; and an electrically conductive film mounted on one surface of said louver element, said film permitting light to pass through openings therein, said film acting as a protective cover for said louver element and acting to avoid electromagnetic waves.

2. The light controlling sheet as recited in claim 1, wherein said film has a pattern which corresponds to the pattern of said louver element.

3. The light controlling sheet as recited in claim 1, wherein said film is opaque so as to absorb extraneous light.

4. The light controlling sheet as recited in claim 1, wherein said film is a member of a contact for a switch.

* * * * *